US006409472B1

(12) United States Patent
McMahon et al.

(10) Patent No.: US 6,409,472 B1
(45) Date of Patent: Jun. 25, 2002

(54) STATOR ASSEMBLY FOR A ROTARY MACHINE AND CLIP MEMBER FOR A STATOR ASSEMBLY

(75) Inventors: Michael E. McMahon, Shapleigh; Robert B. Richardson, Kennebunk; Steven J. Feigleson, Falmouth, all of ME (US); Keith T. Honda, Ellington, CT (US); Christopher G. Demers, Willington, CT (US); Michael A. Servadio, Tolland, CT (US); Kevin A. Walton, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 19 days.

(21) Appl. No.: 09/629,306

(22) Filed: Jul. 31, 2000

Related U.S. Application Data

(60) Provisional application No. 60/147,978, filed on Aug. 9, 1999.

(51) Int. Cl.[7] .................................................. F01D 9/04
(52) U.S. Cl. .................... 415/189; 415/119; 415/209.3; 415/209.4
(58) Field of Search ................................. 415/119, 189, 415/190, 209.2, 209.3, 209.4, 135–137, 210.1; 416/145, 190, 248, 500

(56) References Cited

U.S. PATENT DOCUMENTS 2,812,159 A * 11/1957 Krebs ......................... 415/119
3,343,806 A    9/1967 Bobo et al.
3,751,183 A *  8/1973 Nichols et al. ............. 416/500
3,836,282 A *  9/1974 Mandelbaum et al. ... 415/209.4
3,849,023 A   11/1974 Klompas
3,867,066 A    2/1975 Canova et al.
4,295,785 A   10/1981 Lardellier
4,395,195 A    7/1983 DeCosmo
4,621,976 A * 11/1986 Marshall et al. ............ 415/119
4,655,682 A *  4/1987 Kunz et al. ................. 415/119
4,721,434 A *  1/1988 Marshall et al. ............ 415/119
5,062,767 A * 11/1991 Worley et al. ............ 415/209.3
5,215,432 A *  6/1993 Pickering et al. ........... 415/119
5,399,069 A    3/1995 Marcy et al.
5,681,142 A * 10/1997 Lewis ......................... 415/119
6,296,443 B1 * 10/2001 Newman et al. ......... 415/209.2

FOREIGN PATENT DOCUMENTS

| EP | 421 596 A2 | 10/1991 | |
| FR | 2404102 | 4/1979 | |
| SU | 248891 A * | 7/1969 | .................. 416/500 |
| SU | (11) 730 980 | 10/1978 | |

* cited by examiner

*Primary Examiner*—Christopher Verdier
(74) *Attorney, Agent, or Firm*—Gene D. Fleischhauer

(57) ABSTRACT

A stator assembly for a rotary machine having a shroud for a stator vane is disclosed. Various construction details are developed which limit movement of the stator vane into the flowpath by reason of the stator vane being restrained by the shroud. In one particular embodiment, a clip member extends through an opening in the tip of the vane and is disposed at a location adjacent a nonflowpath surface of the shroud to restrain the tip of the vane against inward movement through the shroud.

16 Claims, 5 Drawing Sheets

STATOR ASSEMBLY FOR A ROTARY MACHINE AND CLIP MEMBER FOR A STATOR ASSEMBLY

This application claims benefit from U.S. Provisional Application Serial No. 60/147,978 filed on Aug. 9, 1999.

TECHNICAL FIELD

This invention relates to a stator structure of the type used in rotary machines, and more specifically, to structure within the compression section to guide working medium gases through the section.

BACKGROUND OF THE INVENTION

An axial flow rotary machine, such as a gas turbine engine for an aircraft, has a compression section, a combustion section, and a turbine section. An annular flow path for working medium gases extends axially through the sections of the engine. The gases are compressed in the compression section to raise their temperature and pressure. Fuel is burned with the working medium gases in the combustion section to further increase the temperature of the hot, pressurized gases. The hot, working medium gases are expanded through the turbine section to produce thrust and to extract energy as rotational work from the gases. The rotational work is transferred to the compression section to raise the pressure of the incoming gases.

The compression section and turbine section have a rotor which extends axially through the engine. The rotor is disposed about an axis of rotation Ar. The rotor includes arrays of rotor blades which transfer rotational work between the rotor and the hot working medium gases. Each rotor blade has an airfoil for this purpose which extends outwardly across the working medium flow path. The working medium gases are directed through the airfoils. The airfoils in the turbine section receive energy from the working medium gases and drive the rotor at high speeds about an axis of rotation. The airfoils in the compression section transfer this energy to the working medium gases to compress the gases as the airfoils are driven about the axis of rotation by the rotor.

The engine includes a stator disposed about the rotor. The stator has an outer case and arrays of stator vanes which extend inwardly across the working medium flowpath. The stator extends circumferentially about the working medium flow path to bound the flow path. The stator includes an outer flowpath wall (outer case) and seal elements supported from the wall for this purpose. An example is an inner shroud assembly having a circumferentially extending seal member (rubstrip). The rubstrip is disposed radially about rotating structure and may be supported, for example, by the vanes through an inner shroud. The rubstrip is in close proximity to associated knife-edge seal elements which extend circumferentially on the rotor and together form a seal that blocks the leakage of working medium gases from the flowpath.

The stator vanes and the rotor blades are designed to receive, interact with and discharge the working medium gases as the gases are flowed through the engine. The arrays of stator vanes are disposed upstream of the arrays of rotor blades in both the compression section and turbine section. The stator vanes each have an airfoil located in a predetermined manner with respect to the adjacent stator vanes for guiding the working medium gases to the rotor blades. The airfoils in the forward portion of the compression section are frequently struck by foreign objects that flow into the engine with the incoming stream of gases. These may include large foreign objects such as wild fowl or chunks of ice that may break away from adjacent structure under operative conditions. The stator vane immediately downstream of the fan blade must tolerate these impacts without tearing loose from adjacent structure and moving rearwardly into the adjacent stage of rotating rotor blades.

In addition, the stator vanes are frequently replaced over the life of the engine. The replacement vanes are preferably located in a repeatable fashion such that the aerodynamic characteristics of the array of compressor vanes are maintained. Finally, seal elements such as rubstrips formed of silicone rubber which are supported by the stator vanes must tolerate severe rubs from rotating structure. Such rubs may occur during normal operative conditions of the engine or during abnormal operative conditions that might occur, for example, after an impact by a foreign object against the engine. The rubstrip must tolerate the severe rub without delaminating (a noncohesive failure) and moving into the flow path.

The above notwithstanding, scientists and engineers working under the direction of Applicants's Assignee have sought to develop stator assemblies having arrays of stator vanes that are locatable in repeatable fashion after replacement and have acceptable levels of durability and replaceability.

SUMMARY OF INVENTION

According to the present invention, the vane of a stator assembly has a clip member which is disposed outwardly of an inner shroud and extending chordwisely with respect to the vane and circumferentially with respect to the vane, the tip of the vane and the clip member being disposed in an elastomeric material to form an inner shroud assembly.

In accordance with one embodiment of the present invention, the clip has an L-shaped member which engages a narrow strip on the vane.

In one detailed embodiment, the clip is disposed in an opening and spaced spanwisely from the vane bounding the opening.

A primary advantage of the present invention is the restraint of a vane assembly at the inner shroud which results from a clip member moving into engagement with an inner shroud under an impact from a foreign object to restrain the tip of the vane. Another advantage is the damping of vibrations in the vane provided by a clip engaging the vane with rubbing contact.

The foregoing features and advantages of the present invention will become more apparent in light of the following detailed description of the best mode for carrying out the invention and accompanying drawings.

BEST MODE

Figure 1:
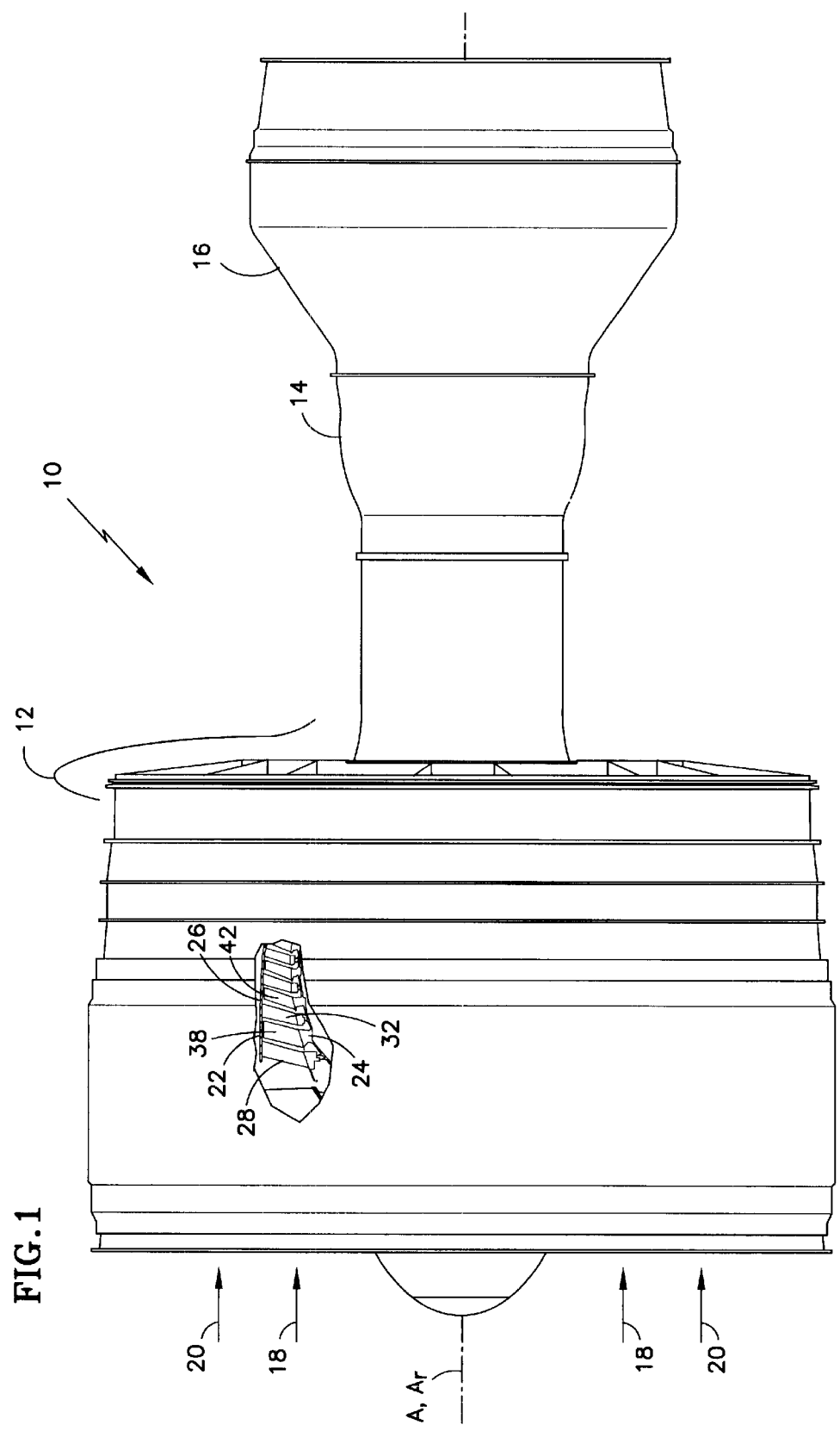
FIG. 1 is a schematic side elevation view of a gas turbine engine with portions of the engine broken away to show the compression section of the engine.

FIG. 1 is a schematic, side elevation view of a rotary machine 10, such as a turbofan gas turbine engine. The engine is disposed about an axis of symmetry A and has an axis of rotation Ar. The engine includes a compression section 12, a combustion section 14, and a turbine section 16. An annular, primary flowpath 18 for working medium gases extends axially through the sections of the engine. A by-pass flowpath 20 is outward of the primary flow path.

The engine is partially broken away to show a stator 22 and a rotor 24 in the compression section 12. The stator 22 includes an outer case 26 (flowpath wall) which extends circumferentially about the primary flowpath. The stator includes arrays of stator vanes, as represented by the stator vane 28 and the stator vane 32 in the compression section. The rotor has arrays of rotor blades, as represented by the rotor blade 38 and the rotor blade 42.

Figure 2:
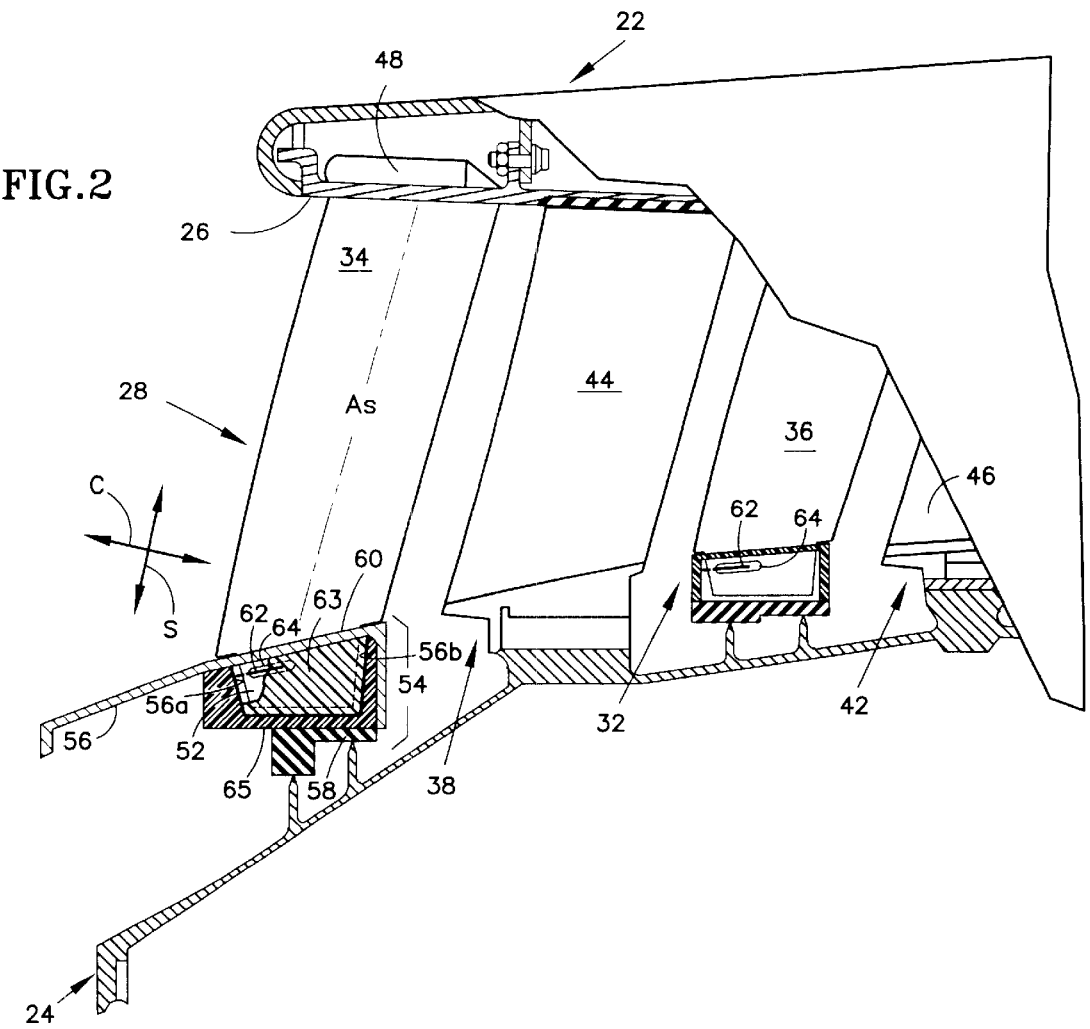
FIG. 2 is a side elevation view of a portion of the compression section shown in FIG. 1

FIG. 2 is an enlarged side elevation view of a portion of the engine shown in FIG. 1 which is partially in section and broken away for clarity. As shown in FIG. 1 and FIG. 2, each stator vane 28, 32 has an airfoil, as represented by the airfoil 34 and the airfoil 36. The airfoils extend inwardly from the outer case to direct the flow of working medium gases as the gases pass through the compression section and the turbine section.

Each rotor blade 38, 42 has an airfoil, as represented by the airfoil 44 and the airfoil 46. The rotor blade airfoils extend radially outwardly across the working medium flow path and into close proximity with the stator 22.

FIG. 2 shows the first array of stator vanes 28 extending radially inwardly from the outer case. Each vane 28 is disposed about a spanwise axis As which extends in a generally radial direction. The vane has a base 48 and a vane tip 52. The vane tip is an extension of the airfoil 34. A plurality of airfoil sections are disposed chordwisely about the spanwise axis As to define the contours of the airfoil (as used herein, plurality means an indefinite number of two or more). The airfoil has a chordwise direction C and a spanwise direction S that provide reference directions. The spanwise direction is generally perpendicular to the axis of rotation Ar.

Figure 4:
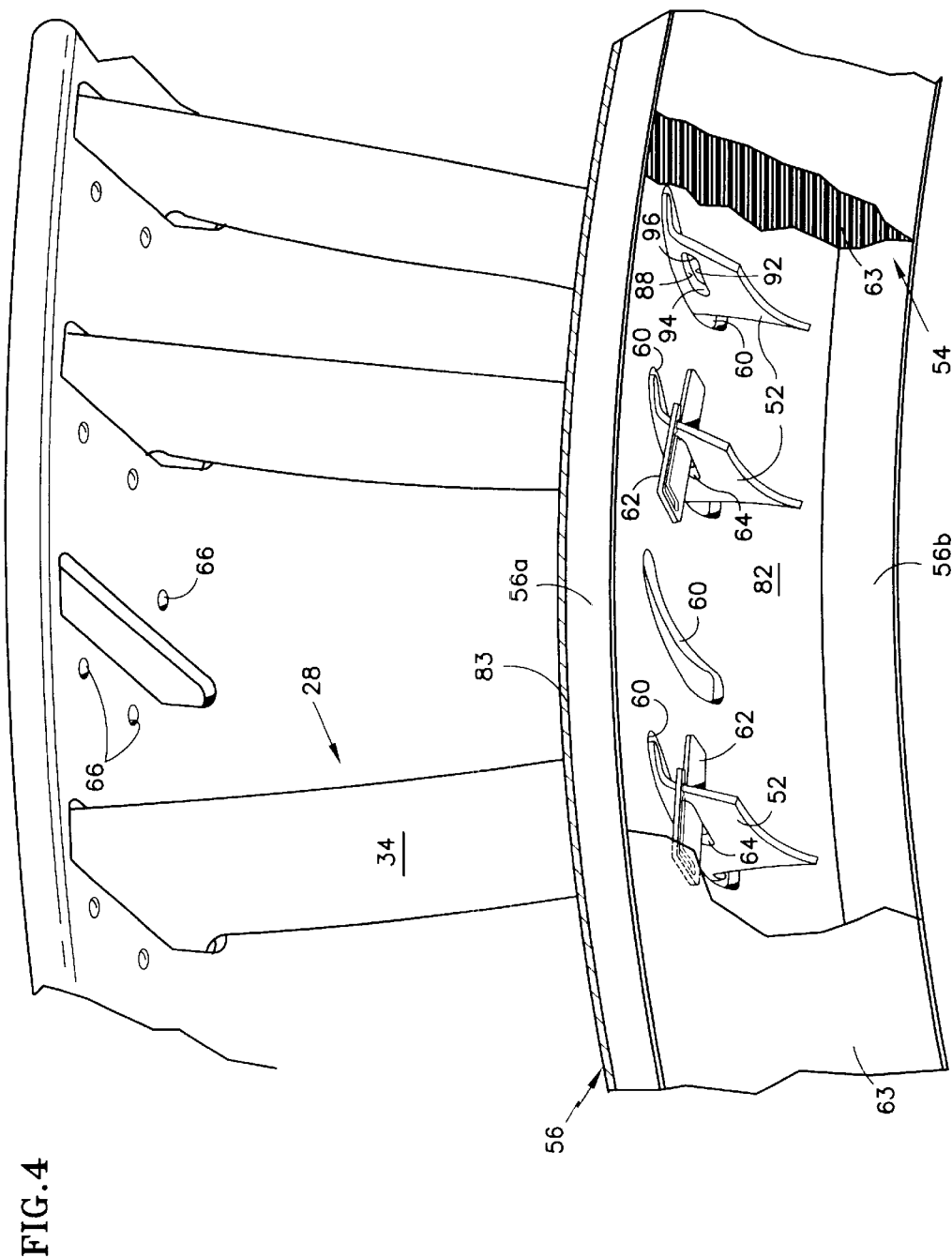
FIG. 4 is a perspective view from below of the outer case and stator vanes of FIG. 3 and shows the tip of the stator vanes and an inner shroud.

An inner shroud assembly 54 extends circumferentially about the axis of rotation Ar and outwardly of the rotor. The inner shroud assembly might be circumferentially continuous or circumferentially segmented. The inner shroud assembly includes an inner shroud 56 and a rubstrip 58. The inner shroud is formed of aluminum. The inner shroud has inwardly extending walls 56a and 56b which are also shown in FIG. 4. In one embodiment, the inner shroud is a circumferentially continuous ring. The rubstrip 58 is formed of an elastomeric material, such as silicone rubber.

The tip 52 of the stator vane 28 extends radially through an associated opening 60 in the inner shroud 56. The opening is disposed between the inwardly extending walls 56a, 56b. A clip member 62 of titanium extends circumferentially through an opening 64 in the stator vane tip 52. The clip member and tip are disposed in a potting member or material 63 formed of a second elastomeric material. The potting member formed of the second elastomeric material is partially broken away for clarity adjacent the stator vane 28 and completely broken away adjacent the stator vane 32. The potting member encapsulates the tip and the clip member. The second elastomeric material might be disposed locally at each vane or extend circumferentially as a circumferentially continuous band. A bottom layer 65 of a third elastomeric material extends circumferentially to support the rubstrip.

Figure 3:
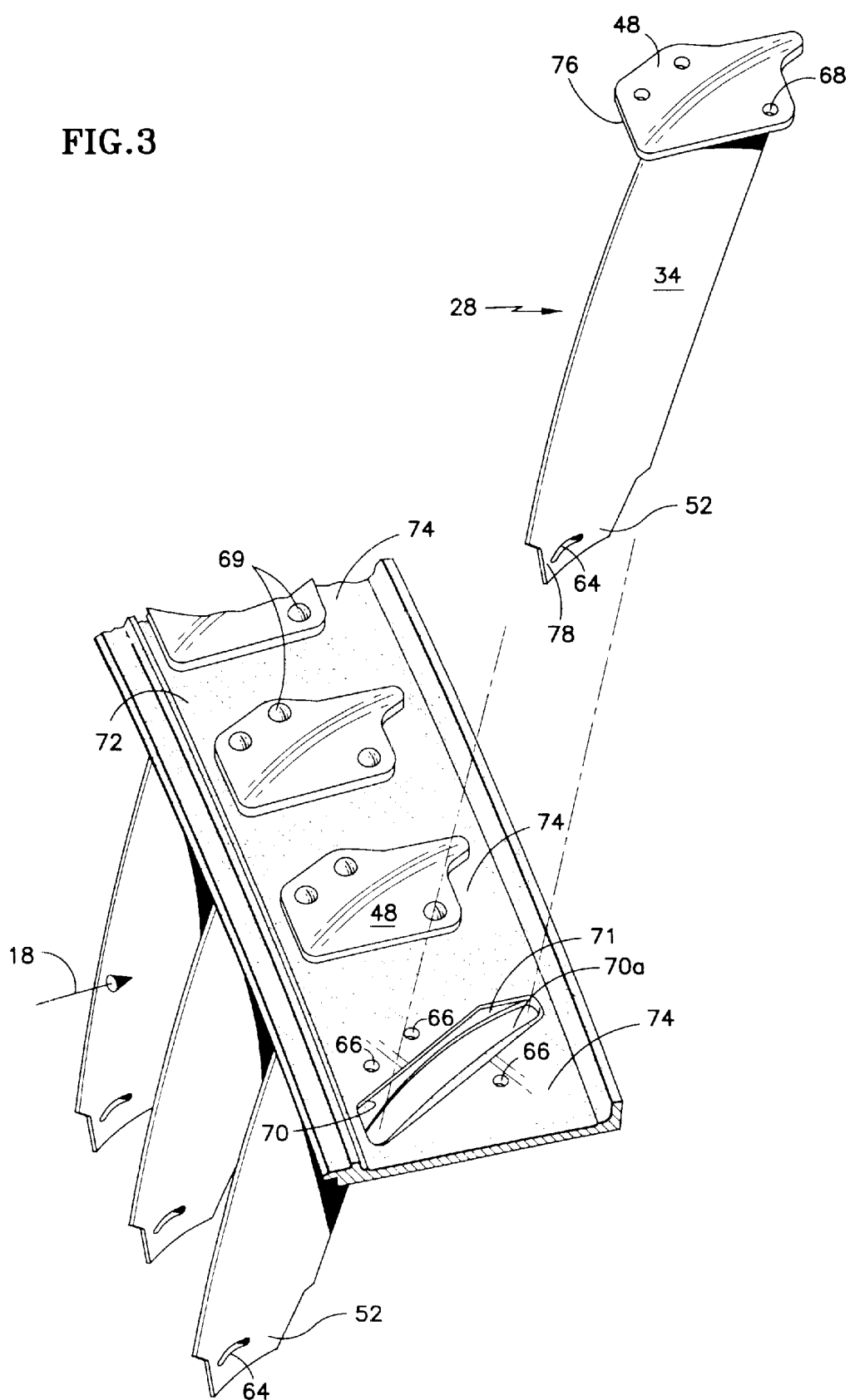
FIG. 3 is a perspective view of a stator vane from the gas turbine engine shown in FIG. 1.

FIG. 3 is a partial perspective view of the array of stator vanes 28 shown in FIG. 2. As can be seen, the outer case has a plurality of openings 66 for fasteners, as represented by the three rivet holes.

The base 48 of the stator vane 28 has three corresponding rivet holes 68, each for receiving an associated rivet 69 formed of a copper nickel composition such as Monel material. The rivets are solid rivets. Each solid rivet is compressed and expanded to completely fill the associated hole and to provide a tight fit for urging the base of the vane 28 into engagement with the outer case.

The outer case has a plurality of circumferentially spaced openings, as represented by the openings 70, 70a. The opening 70 is partially countersunk or counterbored leaving a shelf 71 bounding the opening. The outer case has an outwardly facing, non-flowpath surface 72 which extends circumferentially and which presses against the base of the vane 28. One satisfactory material for the outer case is aluminum. The outwardly facing surface has a plurality of flats 74 or planar surfaces machined into the outer surface which are disposed adjacent to the opening 70. The surfaces may be circumferentially spaced or touch at a boundary. The term "flat" means plane-like within reasonable manufacturing tolerances and not curved.

The vane 28 has an inwardly facing surface 76 which mates with the outer surface on the case. The inwardly facing surface 76 on the base of the vane 28 is planar and lies in a plane at the bearing surface. The plane on the base is parallel to the plane 74 of the finished surface area. In alternate embodiments, the finished surface on the outer case might consist of two flats lying in the same plane, two flats which are angled to each other or which are parallel to each other but lie in slightly radially spaced planes. The simplest approach is to provide a single plane surface 74 or flat for the finished surface area at each of the locations on the outer case and a mating plane surface for those areas of the stator vane 28 which bears against the plane surface. The single plane surface has many advantages such as simplicity of manufacture, inspectability and ability to engage the stator vane 28.

The stator vane 28 extends radially inwardly into and across the working medium flowpath 18. The lock slot 64 or opening in the airfoil 34 adapts the airfoil to receive the clip member 62 as shown in FIG. 2 and FIG. 4. The opening extends nearly to an edge of the airfoil but is spaced from the edge leaving a support strip 78 of relatively narrow material which bounds the opening.

FIG. 4 shows in more detail the circumferentially extending inner shroud assembly 54 including the clip member 62 which is disposed in the lock opening 64 in the tip 52 of the stator vane 28. The inner shroud 56 has an inwardly facing surface or side 82 and an outwardly facing surface or side 83 which bounds of the working medium flowpath. As can be seen, the lock opening and the clip member are spaced radially (spanwisely) from the inwardly facing surface 82 of the inner shroud 56. The clip is also spaced spanwisely from spanwise facing surfaces 88,92 bounding the lock opening in the vane tip. The clip is spaced chordwisely from chordwise facing surface 94 of the chordwise facing surfaces 94, 96 bounding the lock opening in the vane tip.

The potting member 63 is formed of elastomeric material, such as silicone rubber or other suitable rubber, and is disposed in the shroud 56 as a viscous material which flows during fabrication around the tip 52 and the clip member 62 to bond the tip and the clip member to the shroud to form part of the shroud assembly. The bottom layer 65 of material flows around the second elastomeric material. A particular advantage of this construction is that the clip member resists inward movement of the airfoil tip through and away from the shroud. This might occur during a sudden impact by a foreign object which might force the airfoil to move into the path of the rotor assembly or otherwise liberate the airfoil from the case. A particular advantage is the spacing of the lock opening in the airfoil tip and the spacing of the clip member from the shroud. This spacing allows a certain amount of compliant movement between the shroud and the assembly of the vane 28 and clip member in response to changes in diameter caused by mismatches in thermal growth between the outer case and the inner case. Normally, mismatches in thermal growth will be small. However, a more important concern is the absorption of energy during and after an impact of a foreign object against the airfoil. The force of impact is transmitted to the airfoil tending to pull the vane tip radially inwardly. The elastomeric material 63 absorbs some of the energy of the impact as the vane tip moves, and then as the vane tip and clip member move with respect to the elastomeric material toward and to the shroud 56, where the shroud absorbs the rest of the energy as the shroud engages the clip member. The resilient elastomeric material 63 lessens the shock effect on the stator assembly which results from the sudden impact of the foreign object against the vane 28, and from the sharp change in acceleration and the rate of acceleration of the vane 28 in response to the applied force of the foreign object against the vane.

Figure 5:
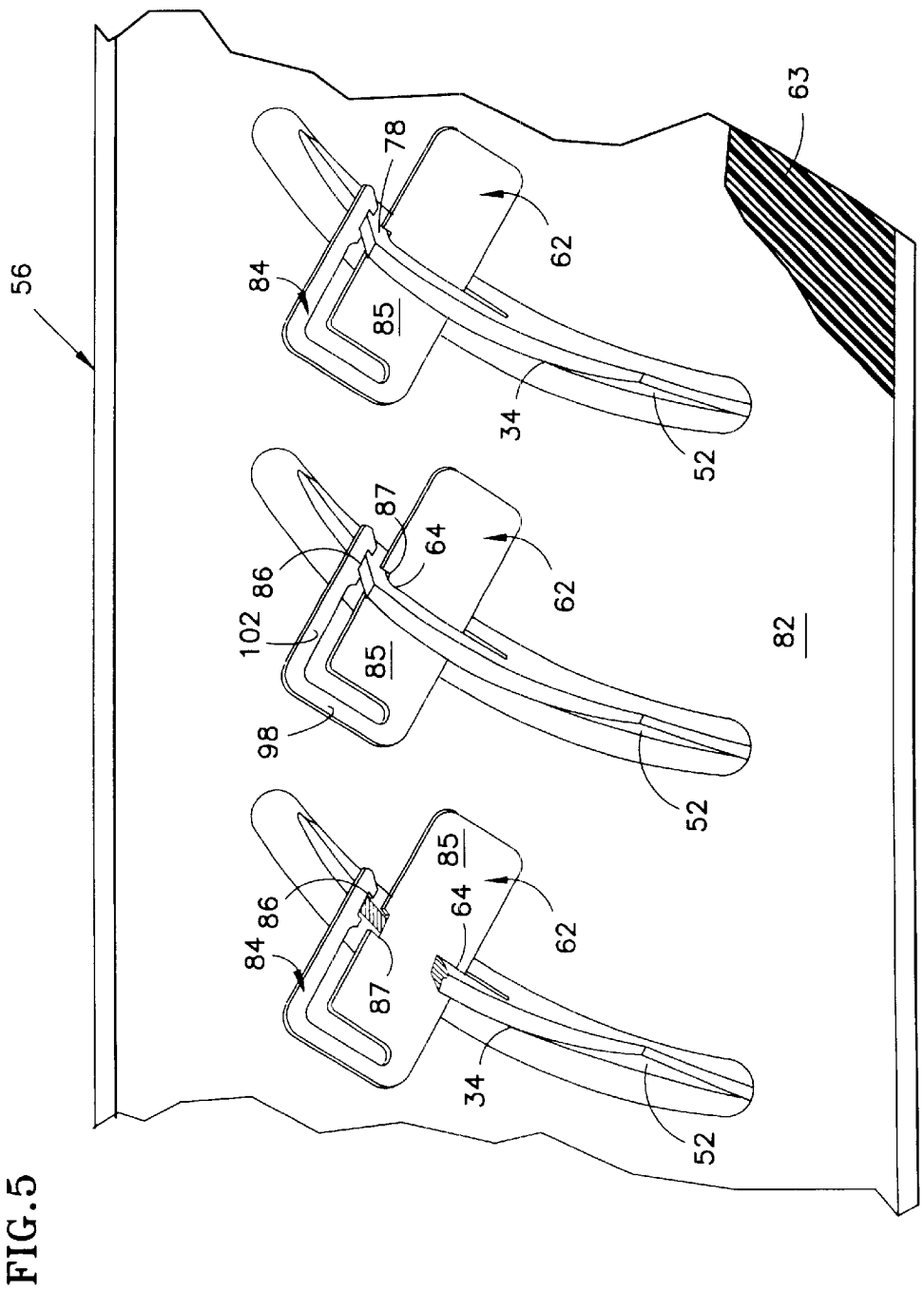
FIG. 5 is an enlarged perspective view from below of the perspective view shown in FIG. 5.

FIG. 5 is a perspective view of the shroud assembly 54 which is partially broken away and sectioned. FIG. 5 shows the engagement between the tip 52 of the airfoil and the clip member 62 at the lock opening 64 in the tip of the airfoil. The clip member is disposed adjacent an edge of the airfoil. The clip member has an L-shaped spring member or retention member 84 and a base 85. The spring member 84 has a notch or indentation 86, which adapts the L-shaped spring member to engage one side of the narrow strip 78 of material at the tip of the airfoil. The clip member has another notch 87 on the base 85 or other side to engage the other side of the narrow strip of the airfoil.

The clip member 62 is titanium as is the vane 28. In this particular construction, the inner shroud of the shroud assembly is formed of an aluminum material. The titanium material was selected for its lightweight, for its modulus of elasticity and yield strength to ensure that the L-shaped member 84 can deflect to engage the thin strip of the airfoil without permanently deforming. The engagement in part is made possible by the L-shaped member 84 having one part 98 extending from one side of the clip member (that is, from one side of the base 85) parallel to the base of the dip member; and then, another part 102 completing the L extending again parallel to the base of the clip member but at right angles to the first part 98 of the clip member. The force exerted by the clip member holds the clip member in place during assembly with the L-shaped spring member pressing against the strip 78 of the stator vane and pulling the base against the strip 78. In addition, the clip member will frictionally engage the tip of the airfoil damping vibrations in the airfoil through coulomb friction and by transmitting a portion of those vibrations to the elastomeric material to further absorb vibrational energy in and from the vane. The frictional engagement takes place at the notch by reason of the clip member otherwise being spaced from the wall surfaces 88, 92 of the opening which extend in the spanwise direction.

Although the invention has been shown and described with respect to detailed embodiments thereof, it should be understood by those of ordinary skill that various changes in form and in detail thereof may be made without departing from the spirit and scope of the claimed invention.

We claim:

1. A stator assembly which is for a rotary machine having a working medium flowpath, which is disposed about an axis A, which has an installed condition in the rotary machine, and which has a plurality of stator vanes extending in a generally radial direction and, in the installed condition, extending inwardly across the working medium flowpath, which comprises:

a shroud extending circumferentially with respect to the axis A for receiving the vanes, the shroud having a first side which faces toward the flowpath in the installed condition and a second side spaced radially away from the first side, and having a plurality of openings each of which adapts the shroud for receiving an associated stator vane;

an elastomeric material which engages the shroud and which is adapted to be disposed about the stator vanes on the second side of the shroud;

at least one stator vane having an airfoil extending spanwisely, the vane extending through the opening in the shroud, the vane having a tip on the second side of the shroud, the tip having a lock opening spaced from the second side of the shroud;

a clip member which is disposed in the lock opening on the second side of the shroud and which is spaced spanwisely from the opening for the vane through the shroud, the clip member extending chordwisely with respect to the vane and circumferentially with respect to the vane such that it extends beyond the opening in the shroud;

wherein the tip of the vane and the clip member are disposed in the elastomeric material to form an inner shroud assembly and wherein under operative conditions movement of the tip of the vane through the shroud is blocked by the clip being urged against and engaging the shroud as a result of movement of the clip.

2. The stator assembly of claim 1 wherein the lock opening is bounded by two spanwise facing surfaces and wherein the clip member is spaced radially from the spanwise facing surfaces of the opening in the tip of the vane.

3. The stator assembly of claim 2 wherein the lock opening in the tip is bounded by at least one chordwise facing surface and the clip member engages said at least one of the chordwise facing surfaces of the vane which bounds the opening in the tip and wherein rubbing contact between the clip member and the vane damps vibrations in the vane.

4. A clip member for a stator vane of a stator assembly of a rotary machine which has an installed condition in the rotary machine, the clip member having a base and a retention member which extends from the base and which is spaced from the base leaving a gap therebetween which is adapted to receive the stator vane and which adapts the clip member to engage the stator vane with the retention member and the base, the retention member being a spring member having material properties such that the retention member presses the base against the stator vane in the installed condition and such that the clip member is spaced from a radial end portion of the stator vane.

5. The clip member of claim 4 wherein the retention member is an L-shaped member attached to the base.

6. The clip member of claim 5 wherein the retention member has a notch facing the base which adapts the clip to engage the stator vane.

7. The clip member of claim 6 wherein the base has a notch facing the notch in the retention member which adapts the clip to engage the stator vane.

8. The clip member of claim 4 wherein the retention member is formed of a material having material properties which adapt the retention member to act as a spring member.

9. The clip member of claim 8 wherein at least two of said material properties of the retention member are the modulus of elasticity and yield strength of the material.

10. The clip member of claim 8 wherein at least one of said material properties of the retention member is the modulus of elasticity of the material.

11. The clip member of claim 8 wherein at least one of said material properties of the retention member is the yield strength of the material.

12. The clip member of claim 4 wherein the retention member is formed of titanium.

13. The stator assembly of claim 1 wherein the clip member has a base and has a retention member which extends from the base and which is spaced from the base leaving a gap therebetween in which is disposed a portion of the tip of the stator vane, the retention member being a spring member such that the retention member and the base press against said portion of the stator vane.

14. The clip member of claim 13 wherein the retention member is an L-shaped member attached to the base.

15. The clip member of claim 14 wherein the retention member has a notch facing the base which adapts the clip to engage the stator vane.

16. The clip member of claim 15 wherein the base has a notch facing the notch in the retention member which adapts the clip to engage the stator vane.

* * * * *